US009548950B2

(12) United States Patent
Henshaw et al.

(10) Patent No.: US 9,548,950 B2
(45) Date of Patent: Jan. 17, 2017

(54) SWITCHING CAMERA ANGLES DURING INTERACTIVE EVENTS

(76) Inventors: Jeffrey David Henshaw, Redmond, WA (US); Alexander Irvin Hopmann, Seattle, WA (US); Christopher Andrew Evans, Sammamish, WA (US); Daniel Evan Socolof, Las Vegas, NV (US)

( * ) Notice: Subject to any disclaimer, the term of this patent is extended or adjusted under 35 U.S.C. 154(b) by 869 days.

(21) Appl. No.: 12/586,923

(22) Filed: Sep. 28, 2009

(65) Prior Publication Data

US 2010/0088159 A1    Apr. 8, 2010

Related U.S. Application Data

(60) Provisional application No. 61/100,701, filed on Sep. 26, 2008, provisional application No. 61/100,703, (Continued)

(51) Int. Cl.
| | |
|---|---|
| *H04L 12/58* | (2006.01) |
| *H04N 7/15* | (2006.01) |
| *G06F 3/0484* | (2013.01) |
| *G06Q 10/02* | (2012.01) |
| *G06Q 10/06* | (2012.01) |
| *G06Q 10/10* | (2012.01) |
| *G06Q 30/02* | (2012.01) |
| *G06Q 30/06* | (2012.01) |

(52) U.S. Cl.
CPC ........... *H04L 51/046* (2013.01); *G06F 3/0484* (2013.01); *G06Q 10/02* (2013.01); *G06Q 10/0637* (2013.01); *G06Q 10/1093* (2013.01); *G06Q 30/02* (2013.01); *G06Q 30/0246* (2013.01); *G06Q 30/0252* (2013.01); *G06Q 30/0282* (2013.01); *G06Q 30/0601* (2013.01); *H04N 7/155* (2013.01)

(58) Field of Classification Search
CPC ..... G06F 3/0484; H04N 7/155; H04N 51/046; G06Q 30/0282; G06Q 30/0601; G06Q 30/0252; G06Q 10/0637; G06Q 10/02; G06Q 30/0246; G06Q 10/1093; G06Q 30/02
USPC ................ 715/756; 725/135, 59; 348/211.12
See application file for complete search history.

(56) References Cited

U.S. PATENT DOCUMENTS

6,317,881 B1 *  11/2001  Shah-Nazaroff et al. ...... 725/24
7,149,549 B1 *  12/2006  Ortiz et al. .................. 455/566
(Continued)

*Primary Examiner* — Nicholas Ulrich
(74) *Attorney, Agent, or Firm* — Perkins Coie LLP (57) ABSTRACT

Multiple camera angles of an interactive event are simultaneously transmitted as part of a broadcast. The simultaneous distribution of multiple synchronized streams of audio and/or visual information enables switching between cameras to be made by the audience members without interruption of the presentation of the event. In one embodiment, a performance studio might send out multiple synchronized concurrent streams. For example, a performance studio might transmit four distinct camera angles or streams, each at varying quality levels, such as the illustrated high-bandwidth and low-bandwidth encodings. Selection of the stream may also direct interactive feedback portions generated by the selecting audience member towards the selected object/individual. Alternatively, interactive feedback generated by the audience member may be directed globally to the producers of the event and selectively to the performers and other audience members of the event.

5 Claims, 6 Drawing Sheets

Related U.S. Application Data filed on Sep. 26, 2008, provisional application No. 61/100,704, filed on Sep. 26, 2008, provisional application No. 61/100,706, filed on Sep. 26, 2008.

(56) References Cited

U.S. PATENT DOCUMENTS

| | | | |
|---|---|---|---|
| 7,196,722 B2* | 3/2007 | White et al. | 348/211.99 |
| 7,376,388 B2* | 5/2008 | Ortiz et al. | 455/3.06 |
| 7,478,334 B2* | 1/2009 | Chen et al. | 715/759 |
| 7,782,363 B2* | 8/2010 | Ortiz | 348/211.8 |
| 7,796,162 B2* | 9/2010 | Ortiz | 348/211.8 |
| 7,884,855 B2* | 2/2011 | Ortiz | 348/211.8 |
| 2003/0208613 A1* | 11/2003 | Signes et al. | 709/231 |
| 2004/0064838 A1* | 4/2004 | Olesen et al. | 725/105 |
| 2004/0261127 A1* | 12/2004 | Freeman et al. | 725/135 |
| 2004/0263636 A1* | 12/2004 | Cutler et al. | 348/211.12 |
| 2005/0024488 A1* | 2/2005 | Borg | 348/36 |
| 2005/0060751 A1* | 3/2005 | Glaser | 725/87 |
| 2005/0210505 A1* | 9/2005 | Chiu et al. | 725/43 |
| 2006/0104600 A1* | 5/2006 | Abrams | 386/46 |
| 2007/0028272 A1* | 2/2007 | Lockton | 725/62 |
| 2007/0233785 A1* | 10/2007 | Abraham et al. | 709/204 |
| 2008/0046910 A1* | 2/2008 | Schultz et al. | 725/12 |
| 2008/0270541 A1* | 10/2008 | Keener et al. | 709/206 |
| 2008/0271082 A1* | 10/2008 | Carter et al. | 725/51 |
| 2008/0282286 A1* | 11/2008 | Or | 725/34 |
| 2009/0089683 A1* | 4/2009 | Thapa | 715/756 |
| 2009/0164876 A1* | 6/2009 | Logan et al. | 715/201 |
| 2009/0309975 A1* | 12/2009 | Gordon et al. | 348/159 |

* cited by examiner

Fig. 1

Fig. 2A Camera Selector

Fig. 2C Emotapplause

Fig. 2B Set List Votes

Fig. 2D Shout Out

SWITCHING CAMERA ANGLES DURING INTERACTIVE EVENTS

CROSS REFERENCE TO RELATED APPLICATIONS

The present application is a non-provisional application that claims priority and incorporates by reference in its entirety provisional U.S. Patent Application No. 61/100,701, entitled "Interactive Live Events" and provisional U.S. Patent Application No. 61/100,703 entitled "Interactive Events" and provisional U.S. Patent Application No. 61/100, 704 entitled "Ticket Scarcity Management for Interactive Events" and provisional U.S. Patent Application No. 61/100, 706 entitled "Switching Camera Angles during Interactive Events" all filed on Sep. 26, 2008.

TECHNICAL FIELD

Embodiments of the present disclosure generally relate to data evaluation, categorization, and presentation. More particularly, the embodiments of the present disclosure relate to systems which manage ticket scarcity for interactive events.

BACKGROUND

Attempts to display media on computers date back to the earliest days of computing. However, little progress was made for several decades, primarily due to the high cost, limited capabilities and to a lesser extent compatibilities of available computer hardware. Recently consumer-grade personal computers have become powerful enough to display various types of media, including high quality audio and/or video streams.

Streaming multimedia represents one method of media distribution. In essence streaming multimedia is multimedia that is broadcast by a streaming provider to an end-user. Generally, the term streaming specifically refers to the delivery method of the data rather than to the content. Unfortunately, streaming typically requires tremendous bandwidth and/or latency to cache the data locally. Recent advances in computer networks combined with powerful home computers and modern operating systems have made possible, i.e. practical and affordable, the near universal distribution of streaming media for ordinary consumers. Universal distribution represents multimedia that is constantly received by, and normally presented to, an end-user while it is being delivered by a streaming provider.

A stream of media can be on demand or live. On demand streams are stored on a server for a long period of time, and are available to be transmitted at a user's request. Live streams may still use a server to broadcast the event, but are typically only available at one particular time, such as a video stream of a live sporting event, a political debate, educational lecture, or a concert. Live streams may be edited and converted into on demand streams for later content consumption. Current on demand or live streams lose any possibility for constructive feedback from the streaming targets. Essentially, live online presentations to large streaming audiences generally only provide unidirectional information in a manner that is difficult to facilitate observer participation. On demand performances are presented after the fact, preventing the presenter and/or observer(s) from directly altering the previously recorded presentation. Moreover, customized presentation of the event for each end-user is also limited due to bandwidth constraints.

SUMMARY

In view of the problems in the state of the art, embodiments of the invention are based on overcoming the technical problem of only providing a single perspective, or vantage point, of an interactive live event. In one embodiment, the disclosure provides for categorization and presentation of selectable and switchable camera angles during an online environment. While the internet already allows many services for one way communication and event broadcast, there have been no options for providing multiple real-time perspectives of the event, including providing two-way interactivity between audience members and the people associated with the event, such as the producers and performers. Systems and methods presented in this disclosure provide this very type of interactivity to create truly compelling live events on the internet.

More specifically, multiple camera angles of an interactive event are simultaneously transmitted as part of a broadcast. The simultaneous distribution of multiple synchronized streams of audio and/or visual information enables switching between cameras to be made by the online audience members of the broadcast without interruption of the presentation of the event. In one embodiment, a performance studio might send out multiple synchronized concurrent streams as part of the broadcast to a content distribution network. For example, a performance studio might transmit four distinct camera angles or streams, each at varying quality levels, such as the illustrated high-bandwidth and low-bandwidth encodings. Audience members of the broadcast may select which stream(s) they want to watch of the broadcast. Selection of one of the streams may also direct interactive feedback portions generated by the selecting audience member towards the selected object/individual. Alternatively, interactive feedback generated by the audience member may be directed globally to the producers of the event and selectively to the performers and other audience members of the event.

BRIEF DESCRIPTION OF THE DRAWINGS

Non-limiting and non-exhaustive exemplary embodiments of the present disclosure are described with reference to the following drawings in which.

DETAILED DESCRIPTION

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of a portion of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may. The term "connected" may mean a direct electrical, electro-magnetic, mechanical, logical, or other connection between the items connected, without any electrical, mechanical, logical or other intermediary there between. The term "coupled" can mean a direct connection between items, an indirect connection through one or more intermediaries, or communication between items in a manner that may not constitute a connection. The term "circuit" or "circuitry" as used in any embodiment described herein, can mean a single component or a plurality of components, active and/or passive, discrete or integrated, that are coupled together to provide a desired function and may include, for example, singly or in any combination, hardwired circuitry, programmable circuitry, state machine circuitry, and/or firmware that stores instructions executed by programmable circuitry. The term "signal" can mean at least one current, voltage, charge, data, or other such identifiable quantity.

In an effort to clarify comparative phrases used in the specification and the claims of this disclosure, please note that the following phrases take at least the meanings indicated and associated herein, unless the context clearly dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(A B) or (B)", that is "A" is optional.

Figure 1:
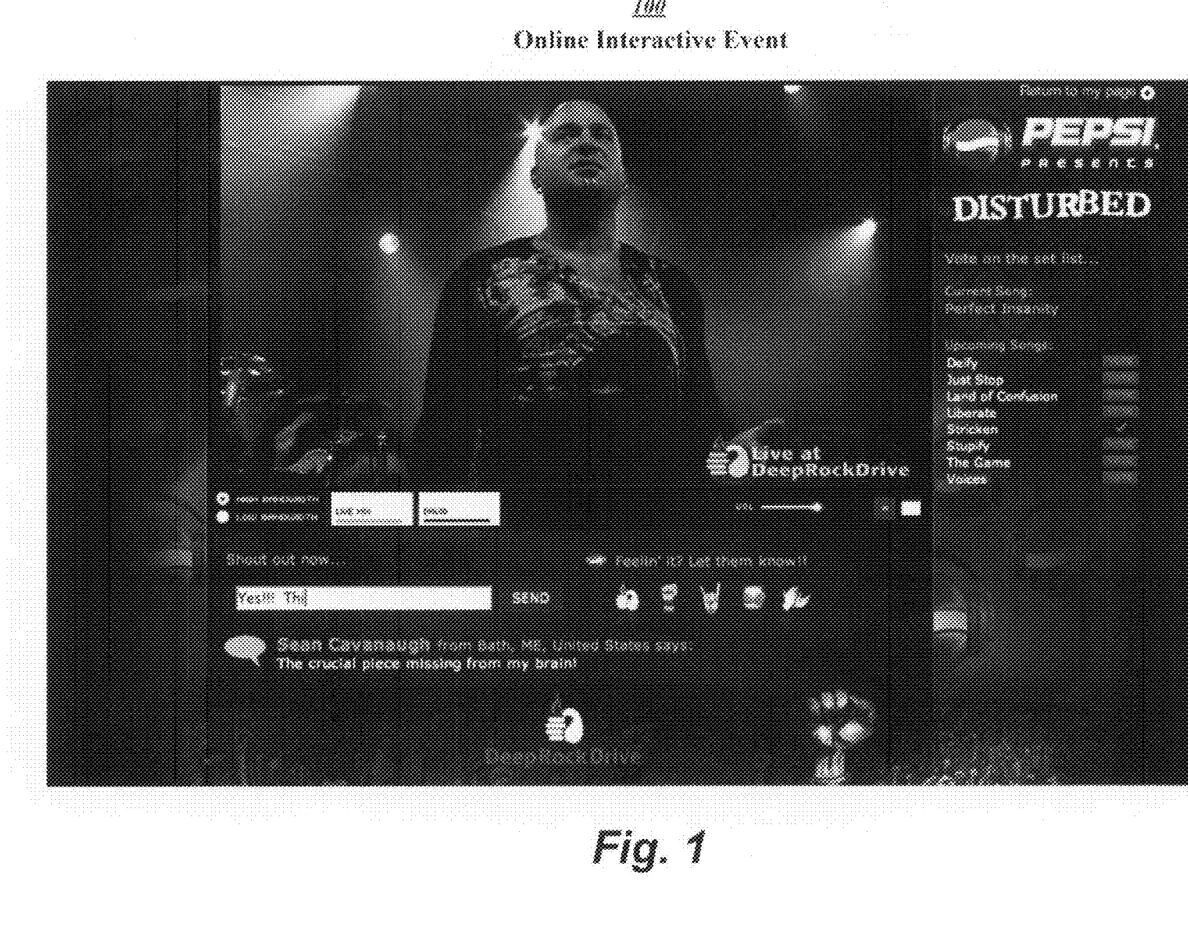
FIG. 1 illustrates a block diagram view of a portion of an interactive client interface of an online interactive event environment during presentation of the event in accordance with various embodiments of the present disclosure.

Referring now to FIG. 1, a block diagram view of a portion of an interactive client interface 100 of an online interactive event environment is illustrated showing portions of the presentation during an interactive event in accordance with various embodiments of the present disclosure. The interactive client interface 100, in one embodiment, may include a video presentation of the event, and audio presentation of the event, or some combination thereof. In one embodiment, the video presentation may be individually selected by audience members. The selection of the video presentation may include choice of camera angle, perspective, and/or relative distance (e.g., zoom in/out). Video presentation selection allows the event attendee to choose the position of their virtual seat in the performance hall. For example, in the illustrated embodiment an audience may have a specialized interest in watching the lead singer, David, or in watching the entire live mix of the band, Disturbed.

The illustrated interactive client interface 100 incorporates into the event presentation the user interfaces 210, 270, 280, and 290 illustrated in FIGS. 2A-2D and are described in greater detailed below. In addition, the illustrated embodiment also shows event sponsorship of the event. Accordingly, this sponsorship may be sold in accordance with a variety of advertising mechanisms, including but not limited to per event, per song, per minute, per impression, or some combination thereof. In one embodiment, an event sponsor may present customized logos and marketing material targeted for the audience of the event. On embodiment provides promotional links on the presentation page of event. When clicked, another window may open without interrupting the stream. Alternatively, a sponsorship link may change the look of the event interface. Other more subtle methods of promotion also considered within the scope of the disclosure include use of a watermark and/or background images and/or desktop/window wallpaper of promotional material.

Referring now to FIGS. 2A-2D, block diagram views of portions of user interfaces (210, 270, 280, and 290) are illustrated. Each user interface generated in an interactive feedback system configured for compelling live event quality via relative interactivity in accordance with various embodiments.

Figure 2A:
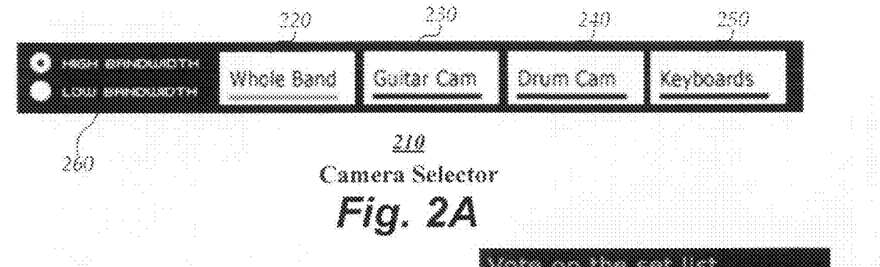
FIGS. 2A-2D illustrate block diagram views of portions of user interfaces, each generated in an interactive feedback system configured for relative interactivity during event presentation in accordance with various embodiments.

In FIG. 2A, portions of user interface 210 are shown illustrating the solicitation on an interactive client of an event attendee to select and transmit a desired event presentation view to the producer. The selection of the video presentation may include choice of camera angle, perspective, and/or relative distance (e.g., zoom in/out). In the illustrated user interface 210 each of the white buttons represent a unique camera and/or microphone pickup of the live event. As illustrated, user interface 210 includes multiple perspectives and/or camera angles including whole band perspective view 220, guitar camera 230, drum camera 240, and keyboards camera 250. By clicking on one of the buttons, the video and audio perspective on the performance of the event, which is being streamed over the Internet or broadcast, is switched to reflect the requested view.

The user interface 210 also includes a bandwidth selector 260. Video presentation selection allows the event attendee to choose the position of their virtual seat in the performance hall. Audience members may have a specialized interest in the performing band and camera angle selection allows the event attendee to choose the position of their virtual seat in the performance hall.

Selectable and switchable camera angles during an online or broadcast event give an Internet- or broadcast-based audience member direct involvement in dictating what part or parts of the event they see at any given moment during the event. The viewing and/or listening to an event, either via the traditional television medium or via streamed webcasts, was previously limited to a single perspective, or vantage point of the event. This would normally be either a fixed position viewpoint, or a director's cut version of the event where a professional production director would dictate which views, which were being relayed to the audience based upon the director's estimation of the most desirable view at a given time. This provided a very limiting experience for fans who wanted more involvement in how the event is consumed.

In contrast, one embodiment calls for multiple camera angles of the interactive event to be simultaneously transmitted as part of the broadcast. The simultaneous distribution of multiple synchronized streams of audio and/or visual information enables switching between cameras to occur without interruption of the presentation of the event. In one embodiment, a performance studio might send out multiple synchronized concurrent streams. For example, a performance studio might transmit four distinct camera angles, each at varying quality levels, such as the illustrated high-bandwidth and low-bandwidth encodings.

In one embodiment, the selection of the camera angle of the event may also direct interactive portions generated by the selecting audience member towards the selected object/individual. For example, if an audience member selected the drummer then the video presentation would switch to a camera angle for the drummer and emotapplause and/or shout outs generated by the audience member would also be directed towards the drummer. Alternatively, in one embodiment, the interactive content generated by an audience member is transmitted globally to the producers of the event and selectively to the performers and other audience members of the event.

Figure 2B:
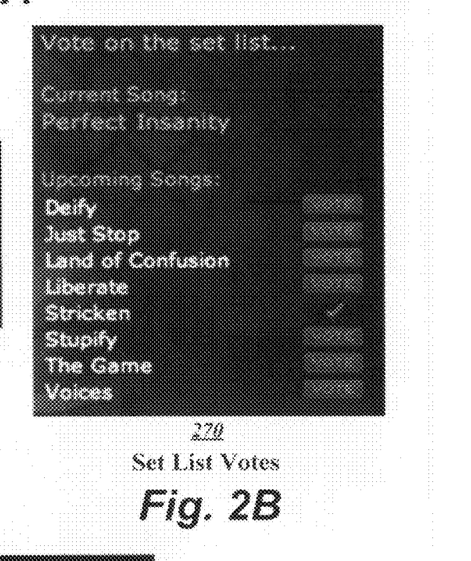

In FIG. 2B, portions of user interface 270 are shown illustrating the solicitation on an interactive client of an event attendee to select and transmit a prioritized interactive playlist. One of the best ways to keep an audience engaged in an event is to give them some control of how the event unfolds. Providing a voting mechanism allows them to decide what song is played next, what topic is covered next or the audience decision on the outcome of some sporting event or any number of other mechanisms for impacting the flow of the event based on popular vote. Voting can be presented as a list of choices below some header describing what is currently being voted on. Each choice has an option for the audience member to make or change their choice. When they make a choice, it is sent to the service which tallies the votes and provides summary information in the client data requests. It will be appreciated by those of ordinary skill in the art and others, that a wide variety of alternate and/or equivalent implementations of voting mechanisms may be substituted for the specific embodiment of voting on a presented playlist as shown. For example, the questions to be voted on can be sent in real time by an administrator, based on input by the performers. In one embodiment, the voting results can be presented in real-time to performers and/or audience members. One embodiment allows past ballot results or voting history to be saved for later use and review.

Figure 2C:
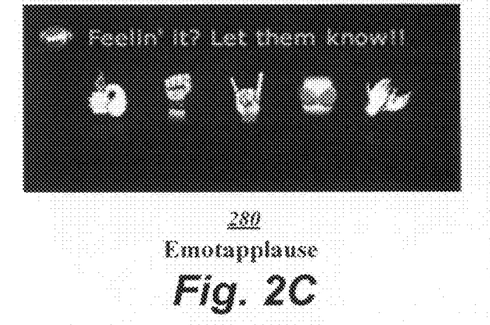

In FIG. 2C, portions of user interface 280 are shown illustrating the solicitation on an interactive client of an event attendee to select and transmit emotapplause via an emoticon indicative of a current emotional state of the event attendee. Emotapplause is a mechanism of sending non-verbal communication from the audience members to the performers. By clicking graphical representations of the emotapplause (such as clapping hands, a heart, etc) a message is sent to a centralized service that aggregates all of the feedback from the audience. The performers then see a graphical representation of the aggregated feedback. The actual experience by the performer changes based on how many audience members are using that emotapplause image at that moment, so if 70% of the audience was 'clapping' and 10% of the audience was sending kisses, the visualization might include very large clapping hands, or perhaps many clapping hands and a smaller representation of kissing lips. Other sample emoticons include a lighter, a unity or rock-on fist, a hang-loose or horned devil hand sign, a virtual bra, and clapping. It will be appreciated by those of ordinary skill in the art and others, that a wide variety of alternate and/or equivalent implementations of emotapplause may be substituted for the specific embodiment of emotapplause shown. For example, emotapplause messages may be displayed to the performers based on statistical aggregation of the number of times each emotapplause item is clicked by audience members in accordance with one embodiment. It may be appreciated by those of ordinary skill in the art and others that a variety of algorithms may be used to determine the quantity, size and intensity of the animation that is presented to the performers. For example, if a statistically larger percentage of the audience is clicking one icon in the most recent set of data received from the interactive clients, the associated animation may be larger than the other animations for the less used emotapplause at that moment. Alternatively, in one embodiment, if one form of emotapplause is trending up in total number of clicks over a number of recent requests for data from the service that could result in the corresponding animations also growing in size, quantity and/or intensity. Similarly, if a trend is downward, the corresponding animations could shrink in size, quantity, and/or intensity. In one embodiment, different animations may be displayed to indicate some such large milestone has been hit when detected emotapplause images from the audience hit a designated milestone in number or a threshold gauging relative intensity of user actions is reached. In one embodiment, multiple animations may be shown simultaneously, and/or different display surfaces may show different sets of animations where the placement of the display surfaces could indicate a higher or lower priority to the performer or audience. In one embodiment, animations on the audience member's interface could also show similar animations based on the activity of the overall audience, so they will be able to see how active different emotapplause items are. Various embodiments enable animations to be overlaid on the video stream to allow audience members to see exactly what the performers are seeing.

Figure 2D:
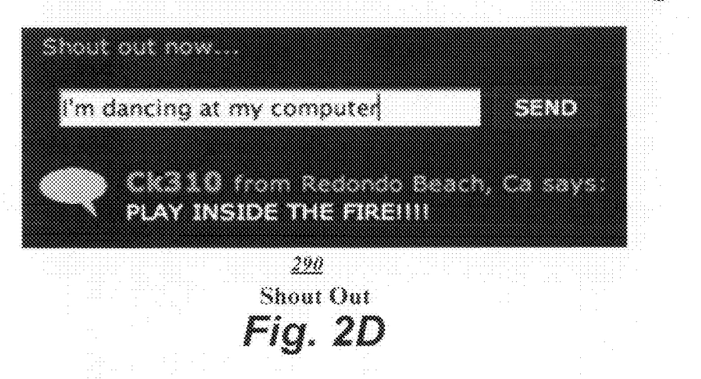

In FIG. 2D, portions of user interface 290 are shown illustrating the solicitation on an interactive client of an event attendee to provide and transmit a virtual shout out to the performer. Shout outs are a text messages sent from the audience members to the performers and audience members. The intent of the shout out is for the audience members to be able to send a directed message or question to the performers. In addition to the performer seeing the message at the performance venue, the audience members also see a subset of the messages, thus providing a sense of community among all of the audience members. Because the number of audience members could be very large for a worldwide internet event, there is no guarantee that all messages will be presented to the performers but due to the mechanism of transferring shout out messages, a good random sampling of messages from all audience members will be presented to both the performers and other audience members. It will be appreciated by those of ordinary skill in the art and others, that a wide variety of alternate and/or equivalent implementations of selective instant messaging mechanisms may be substituted for the specific shout out embodiment shown. For example, in one embodiment, messages from audience members may be filtered if the same message is sent multiple times in a row to prevent "spamming" of messages to the participants. Moreover, messages from audience members may also be filtered based on content and length. In one embodiment, the audience and/or performers may be shielded from inappropriate content or specific topics. In one embodiment, a message can be filtered if too long to prevent situations where information download would be slowed by extra long messages. One variation allows long messages to be parsed and resent separately, while another throws out long messages. Determining which action should be taken may be based in part on the content of the message.

In one embodiment, specific audience members can be blocked from sending messages if they are found to be consistently sending inappropriate messages and/or "spamming" messages. When messages are blocked, various embodiments allow the audience member to still see their message as if they were sent, so that they are unaware that messages they send have been blocked.

In one embodiment, messages that are displayed to audience member and/or performers are displayed for a relative period of time related to the length of the message, so that longer messages are displayed longer while short messages go by faster. This helps audience and/or artist to both read and comprehend messages before they disappear. For example, messages like "yay!" take less time to comprehend than more complex messages like "That was amazing, what were you thinking when you wrote that song?" In one embodiment, the message animations at event location may be overlaid on the video stream to allow audience members to see exactly what the performers are seeing.

In one embodiment, when the incoming content is slow, for example from a low attendance event, the client may show messages from farther back in time. However, one embodiment monitors and limits the length of time that an old message may be used to prevent displayed messages from seeming out of context due to latency since the message was originally sent.

Figure 3:
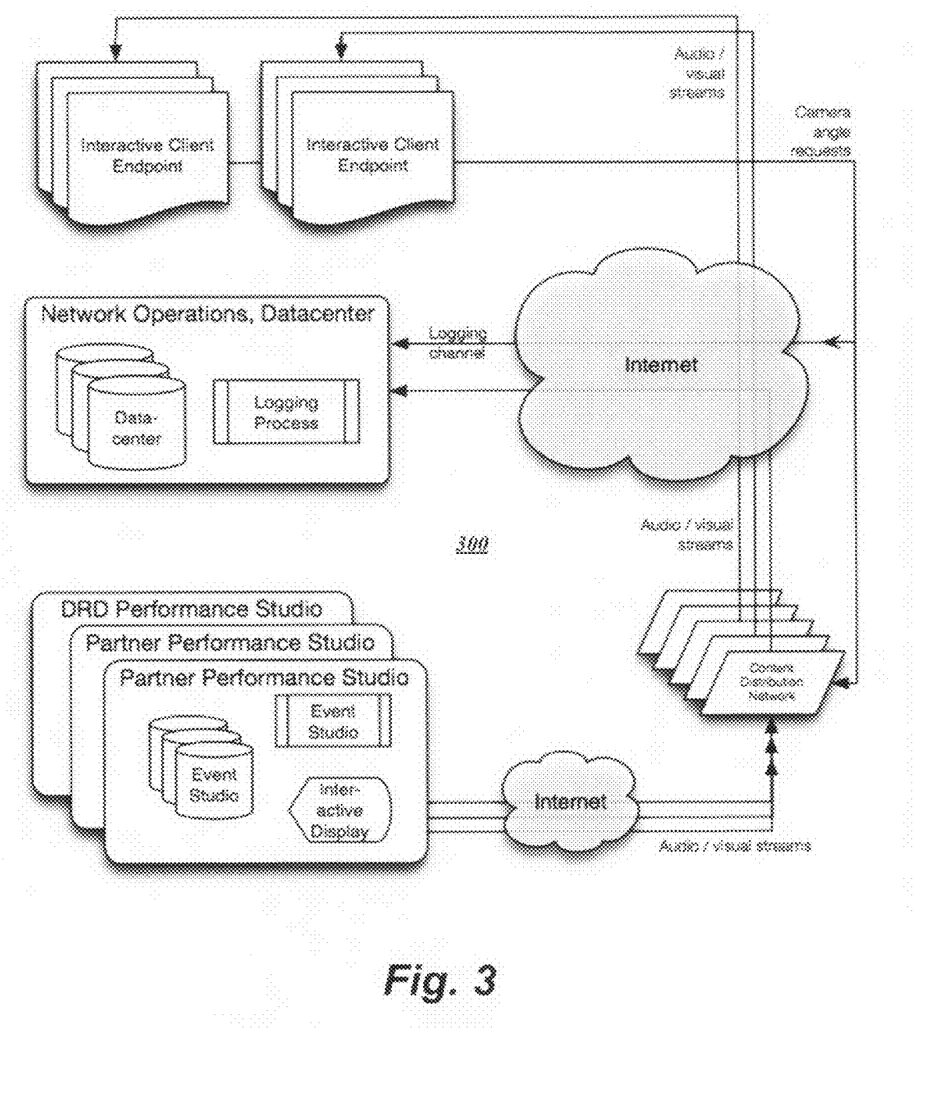
FIG. 3 illustrates a block/flow diagram view of a portion of computer systems in an exemplary online interactive event environment in accordance with at least one embodiment.

Referring now to FIG. 3, a block diagram of various computer systems in an online interactive event environment 300 is shown. Computer systems useful for data evaluation, categorization, and presentation of interactive events are shown in accordance with various embodiments of the present disclosure. The online interactive event environment 300 includes both a variety of operating environments and a variety of network devices. Operating environments within the online interactive event environment 300 may include, but are not limited to, multiple interactive client endpoints that may attach via a communication network, such as the internet, to a production center and/or one or more performance studios. The online interactive event environment 300 may also include a content distribution network for receiving camera angle requests and transmitting requested audio/visual streams. The online interactive event may also transmit other interactive data, such as the camera angle requests to the production center and/or the content distribution network.

In one embodiment, the production center includes network operations and a datacenter including a logging process for monitoring the event. The production center is configured to transceive audio/visual streams and to receive a logging channel of the event. In one embodiment, the performance studio includes an event studio, an event database, an event interface, and at least one interactive display. In one configuration, each channel at a designated bandwidth level may be associated with a camera and/or an interactive display. In one embodiment, a lower bandwidth stream of the event is sampled from the high bandwidth stream of the event to reduce the number of cameras necessary. As illustrated, the production center and performance studio may be separately connected via a private communication network or via a virtual private network across a public communication network, such as the internet.

An interactive client endpoint may represent a variety of consumer devices including, but not limited to, general purpose computer systems, personal digital assistants, digital media players, mobile telephones, video equipment, application specific devices, and other digital communication devices.

Performance centers provide executable code and operational data to the interactive client endpoints, directly and indirectly via the production center. Interactive client endpoints, in accordance with various embodiments, can be visitors of the event website, people who own or purchase a ticket, employees of the production company running the web site, or any other types of people or device that may participate in the interactive event. Various multimedia devices may be used to upload a rich variety of media information for or about an event to the event profile. For example, multiple cameras or webcams may be used to collect video images of an event, conduct a separate web interviews, and/or provide a video preview of an event. Likewise, multiple microphones may be used to collect sound from the event and/or associated interviews or advertisements.

In one embodiment, the audience member at the interactive client endpoint joins an ongoing event and initiates interactivity with the event by typing a message, clicking or otherwise choosing an emotapplause image, voting for event presentation lists, selecting a camera angle, or some other method of indicating the message they would like to send. The messages are then sent to a centralized internet web service that adds user information about that audience member such as their name, image, location, source, etc. That information is then stored in a central database or data store such that the web service may index, search, log and recall each request, or aggregated totals of requests.

Interactive client applications can then periodically issue requests for the current summary state of the interactivity information via a logging channel. That information includes a set of recent shout out messages and their related metadata, the current aggregate information for emotapplause items, current voting topics and voting choices, and any other status information that is helpful for the client to be able to process this data. Because of the potential quantity of requests coming from audience members, various caching mechanisms can be used to reduce the overhead spent gathering this information on every request. To maintain relevancy it is important that the information sent out to clients be very current, so as to maintain the feeling of interactivity at the event. In one embodiment, shout out messages are not allowed to be more than about 30 seconds old (time they were sent from audience member) and preferably represent the most recent messages received by the system. The response to the interactive client may be encoded in at least one of a variety of different formats, including but not limited to, XML, JSON, CSV, and the like.

In one embodiment, when the interactive audience client or performance studio client initially receives the data, they present the information to the performers or audience members in an appropriate way. For the performers, that may be showing the name of the audience member, their image, location and the shout out message itself in an interesting animation. Some additional options for emotapplause and shout outs were described previously with reference to FIG. 2C and FIG. 2D.

Figure 4:
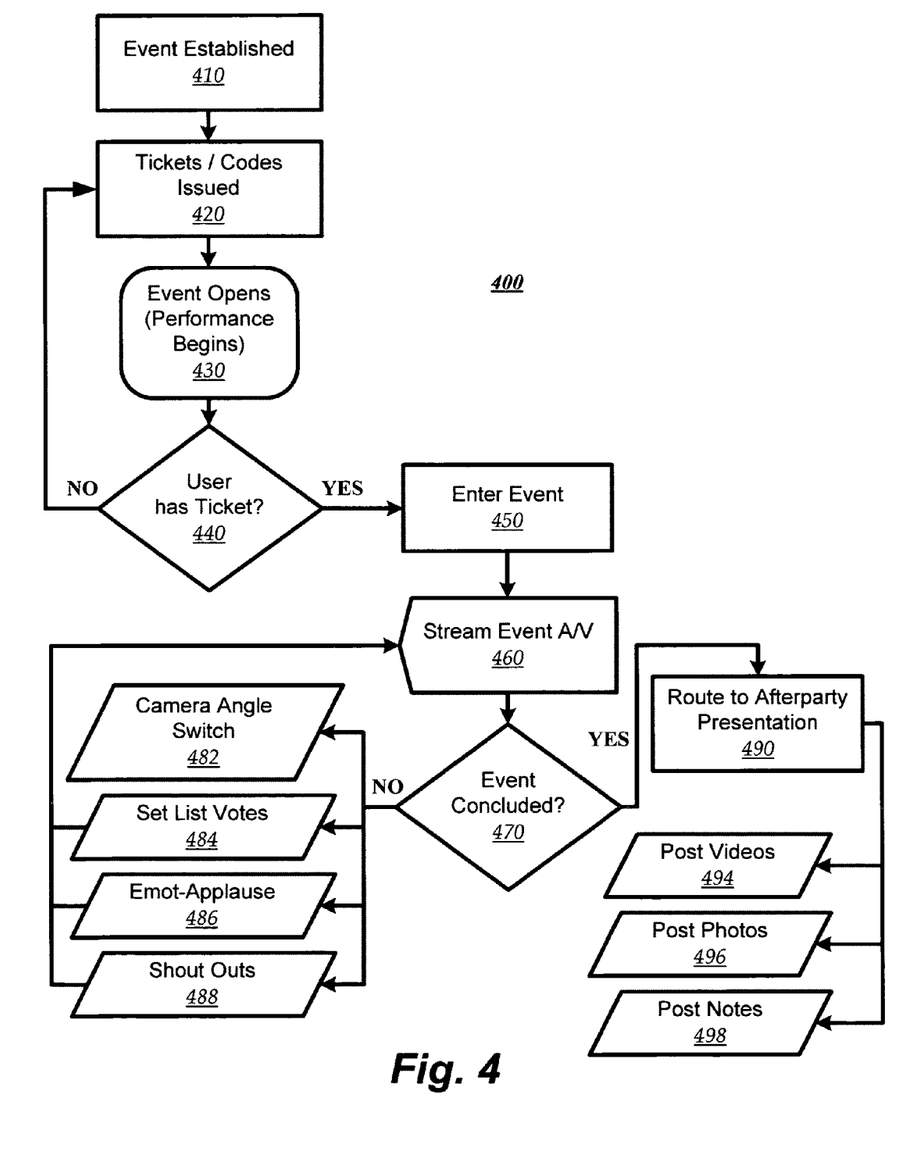
FIG. 4 illustrates a flow diagram view of a method of a portion of operation for interactive event data evaluation, categorization, and presentation in accordance with at least one embodiment.

Referring now to FIG. 4, a flow diagram view of a portion of a method of operation 400 for interactive event data evaluation, categorization, and presentation is illustrated in accordance with at least one embodiment. Initially the event is established in block 410. The established event may include information about the performers at the event, size (number of available tickets), ticket sales thresholds, anticipated playlists, online location of the event, and other particulars about the event. In block 420 tickets or admission codes for the event are issued based on event information.

Once the event opens in block 430, such as the beginning of a performance, the method 400 begins to determine which interactive clients may have access to the data being transmitted. Query block 440 handles this by determining whether the soliciting client has ticket or admission code. If not then the soliciting client is encouraged to purchase a ticket in block 420. If the client has a ticket, then they are allowed into the event in block 450. Upon registering with the event coordinators, the interactive client will be allowed to receive the event stream in block 460, including at least one integrated multimedia audio and video stream from the performance studio. In one embodiment, the integrated multimedia audio and video stream includes multiple synchronized streams, one for each camera angle.

Monitoring block 470 determines whether the event has concluded. If not concluded, the method 400 continues to accept and process interactive inputs from the interactive client, such as requests to change camera angles 482, voting information 484 including votes regarding upcoming playlists, emotapplause 486, and shout outs 488. If the event has concluded, the method 400 directs interactive clients towards after party presentations 490 associated with the event, which may include post videos 494, post photos 496, post notes 498, and other post event offerings. In one embodiment, the post videos 494 may include the entire event stream for review of the interactive client. In one embodiment, the post photos 496 may include a collection of images from the event and/or publicity shots of the performers at the event. In one embodiment, the post notes 498 may include links to additional information about the performers at the event, including future concerts that may be available.

Figure 5:
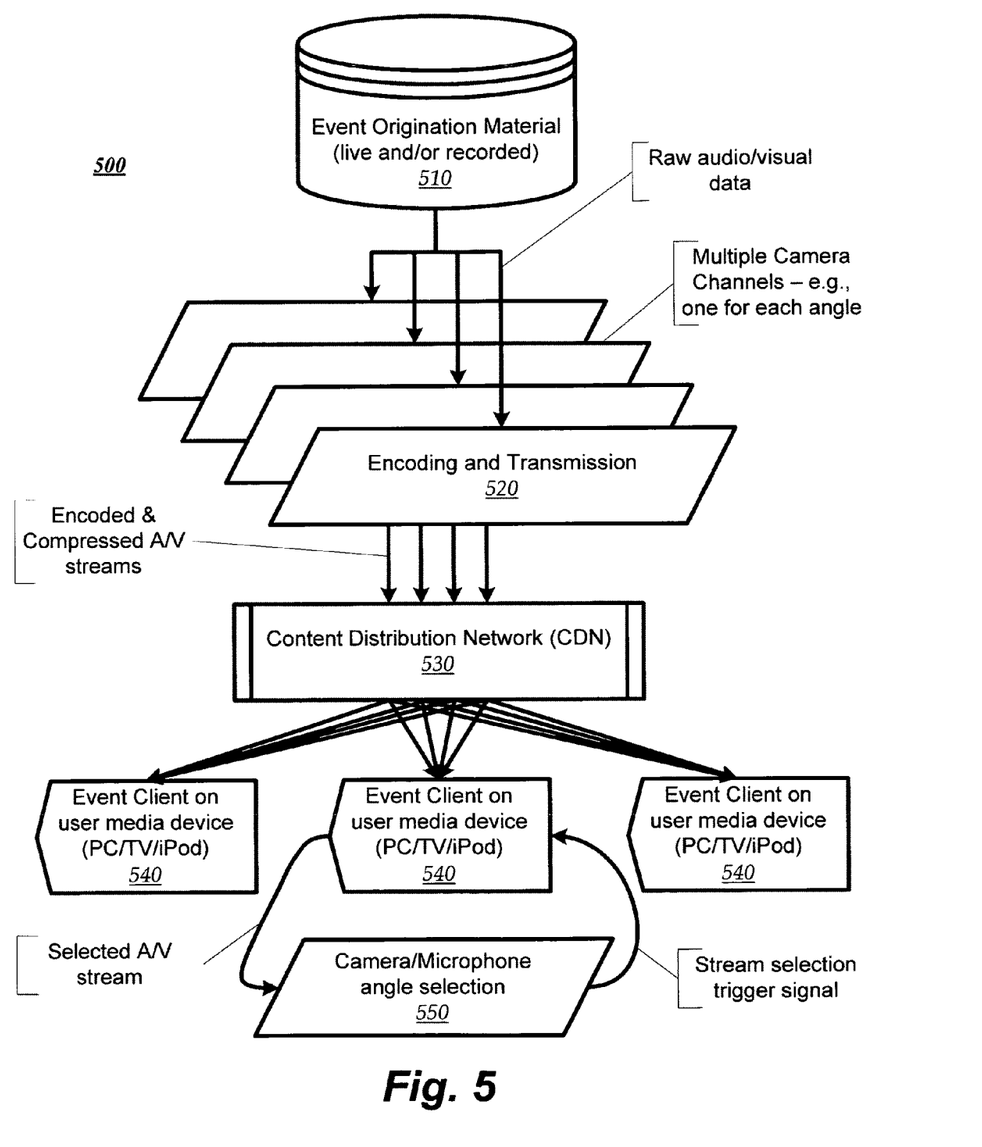
FIG. 5 illustrates a block/flow diagram view of a portion of computer systems to distribute content across multiple channels in an exemplary online interactive event environment in accordance with at least one embodiment.

Referring now to FIG. 5, a block/flow diagram view of a portion of computer systems 500 configured to distribute content across multiple channels in an exemplary online interactive event environment in accordance with at least one embodiment. The computer systems 500 include a database of event origination material 510 (live and/or recorded on demand), encoding and transmission stations 520, content distribution network 530, and multiple event clients 540 installed on user media devices. At least one user media device having a camera/microphone selector 550.

The event origination material is transmitted as raw audio/visual data to multiple encoders and transmitters. Encoded and Compressed audio/visual streams are delivered from the encoders and transmitters to a content distribution network 530. The content distribution network 530 distributes multiple streams including a variety of camera angles of the interactive event to multiple event clients 540 installed on user media devices. In one embodiment, event clients 540 are able to select a desired stream from the multiple streams received from the content distribution network and play the selected audio/visual stream. The event client 540 may be deployed on a user personal computer, television, personal music player, and/or other multimedia electronic device.

In various embodiments, the event client 540 may receive all of the potential streams from the content distribution network and may be configured to operate in at least one of three different modes. The first operational mode including rendering only the selected stream. In this first mode, only one stream is being buffered by the client and the other streams are either not buffered or ignored/discarded altogether. When a stream-switch request is signaled by the event client, the target (new) stream is buffered from scratch and the former stream is discarded.

The second operational mode including receiving partial or thumbnail non-selected streams, while receiving and rendering the full selected stream. In this second mode, one video and/or audio angle is selected and is considered primary, and is fully received and displayed. The other switchable streams are buffered slightly, received and reviewed in part or at lower bandwidth, and are displayed as animated thumbnails. When a stream switch signal is detected from a user camera button, the current primary stream becomes secondary and is relegated to a thumbnail and the target (new) stream is inflated to a fuller size and full bit rate reception.

The third operational mode including receiving full streams of all potential camera/microphone angles. In this third mode, all of the potential angles are received in full, regardless of how they are rendered. Even if secondary (non-selected) angles are rendered as thumbnails, the fact that the full-bit rate streams are receive and fully buffered results in a sense of "instant switching" from a client perspective. This scenario is generally only used in the most optimistic of network conditions with sufficient bandwidth availability.

Figure 6:
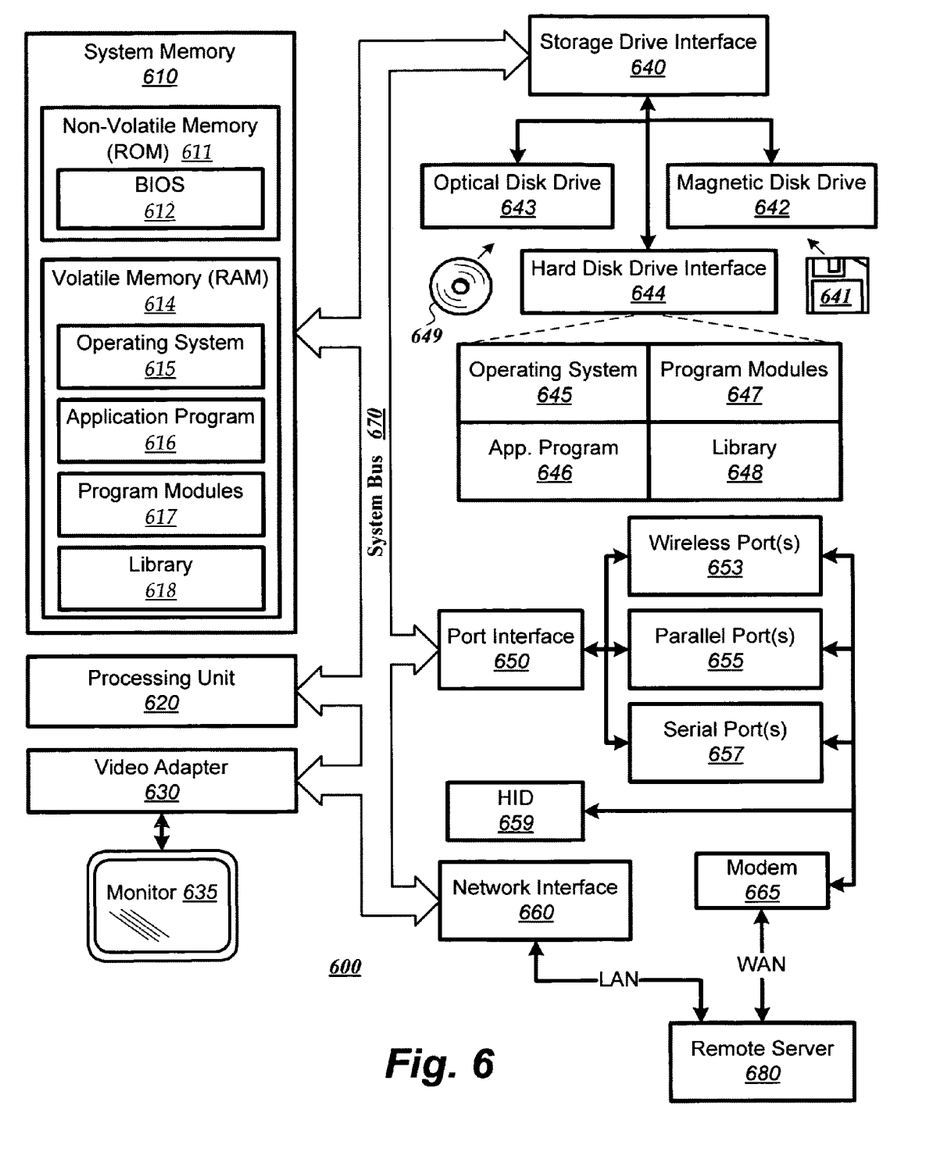
FIG. 6 illustrates a block diagram view of components contained in an interactive client system configured in accordance with at least one embodiment.

Referring now to FIG. 6, a computer system is shown for implementing at least one embodiment of the invention, the system including a computing device 600 in which executable and operational data may be hosted and transmitted to one or more interactive stations via a communication network of the previously described online interactive event environment 300. Computing device 600 may be configured as a client, a server, a mobile device, or any other computing device that interacts with data in a network based collaboration system.

In a very basic configuration, computing device 600 typically includes at least one processing unit 620. In one embodiment, the processing unit 620 includes at least one processor. As such, the term "processor", as used herein, should be interpreted to mean an individual processor, firmware logic, reconfigurable logic, a hardware description language logic configuration, a state machine, an application-specific integrated circuit, a processing core co-disposed in an integrated circuit package with at least one other processing core and/or component, or combinations thereof.

The processing unit 620 may be operably connected to system memory 610. Depending on the exact configuration and type of computing device, system memory 610 may be non-volatile memory 611 (such as ROM, flash memory, etc.), volatile memory 614 (such as RAM), or some combination of the two. System memory 610 typically includes Basic Input/Output System (BIOS) firmware code 612, an operating system 615, one or more applications 616, and may include program modules and data 617. A configuration library 618 (e.g., registries), which contain code and data to be shared and changed in a modular or database fashion to provide services to applications 616 and programs 617 is also often included in system memory 610.

Computing device 600 may have additional features or functionality. For example, computing device 600 may also have a dedicated graphics rendering device, such as video adapter 630 coupled with at least one display monitor 635.

Computing device 600 may also have a variety of human input device(s) (HID) 659 such as keyboard, mouse, pen, voice input device, touch input device, and the like. In a broader sense, human input device (HID) 659 may also include various output devices such as a display monitor 635, speakers, printer, and the like. Computing device 600 may utilize a variety of ports via port interface 650 to share data including wireless ports 653, parallel ports 655, and serial ports 657. Each of these port types may include further varieties, for example serial ports may include a Universal Serial Bus (USB) port and/or a FireWire/IEEE 1394 port.

In various embodiments, computing device 600 may also include a storage drive interface 640 for communication with additional data storage devices (removable and/or non-removable) such as, for example, magnetic disk drives 642, optical disk drives 643, hard disk drives 644, tape drives, and other storage devices. Such additional storage is illustrated in FIG. 6 by removable magnetic storage 641 and removable optical storage 649 and non-removable storage (hard disk drive 644).

Computer storage media may include volatile and non-volatile, removable and non-removable media implemented in any method or technology for storage of information, such as computer readable instructions, data structures, program modules, or other data. System memory 610, removable storage and non-removable storage are all examples of computer storage media. Computer storage media includes, but is not limited to, RAM, ROM. EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be used to store desired information, such as operating system 645, one or more applications 646, programs 647, and/or registries and configuration libraries 648 accessible to computing device 600.

Computing device 600 may also contain a communication connection via port interface 650 and/or network interface card 660 that allows the device 600 to communicate with other remote computing devices 680, such as over a communication network. The communication network may comprise a local area network (LAN) and/or a wide area network (WAN). Each network may be wired or wireless or combination thereof. The communication network may also comprise other large scale networks including, but not limited to, intranets and extranets, or combinations thereof. In one embodiment the communication network is an interconnected system of networks, one particular example of which is the Internet and the World Wide Web supported on the Internet.

A variety of configurations may be used to connect the computing device 600 to the remote computing devices 680. For example, although modem 665 is illustrated as connecting to the remote computing device 680, a remote server, via a WAN and network interface 660 is illustrated as connecting via a LAN, both the network interface 660 and/or the modem 665 may just as well be coupled to other large scale networks including, but not limited to, a global system of interconnected computer networks (internet), various intranets and extranets, or combinations thereof.

The information transmitted as data across the previously discussed communication connections are examples of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although many of the examples refer to computing devices with a single operating system, file system and configuration library, the concepts, principles, and examples disclosed below may be extended to provide interactive event functionality across several or many operating systems, file systems, and/or configurations libraries (e.g., registries). Accordingly, it is contemplated that the principles described herein may be applied to these and other computing systems and devices, both existing and yet to be developed, using the methods and principles disclosed herein.

The above specification, examples and data provide a complete description of the manufacture and use of the composition of the invention. Although specific embodiments have been illustrated and described herein, it will be appreciated by those of ordinary skill in the art and others, that a wide variety of alternate and/or equivalent implementations may be substituted for the specific embodiment shown in the described without departing from the spirit and scope of the present disclosure. This application is intended to cover any adaptations or variations of the embodiments discussed herein. Therefore, it is manifested and intended that the disclosure be limited only by the claims and the equivalence thereof.

What is claimed is:

1. A method for participation in interactive online events, comprising:
   at an interactive client of the interactive online event,
   receiving multiple streams of an event from an event performance studio;
   selecting a stream from the multiple streams;
   displaying the selected stream of the event for user observation; and
   transmitting user initiated feedback messages to an object of the selected stream and not to objects of non-selected streams.

2. The method as recited in claim 1, wherein selection of the stream may include selection of a camera angle of the event.

3. The method as recited in claim 1, wherein the user initiated feedback messages are transmitted globally to producers of the event.

4. A interactive event system comprising:
   a performance studio having at least two interactive displays and configured to produce two or more streams of an interactive event;
   a production center for producing the interactive event based on event material received from the performance studio; and
   at least two interactive clients, at least one of the interactive clients having i) a stream selector, and ii) at least one interactive display, wherein selection of a stream using the stream selector causes event feedback generated at a respective one of the interactive clients to be transmitted to an object of the selected stream and not to objects of non-selected streams.

5. The method of claim 2, wherein transmitting the user initiated feedback messages to the object of the selected stream comprises displaying the user initiated feedback messages on a screen viewable by the object of the selected stream.

\* \* \* \* \*